UNITED STATES PATENT OFFICE 2,309,562

HYDRAZINOALKYL SULPHONIC ACIDS

Hans Zischler, Bitterfeld, and Gustav Wilmanns, Wolfen, Kreis Bitterfeld, Germany, assignors, by mesne assignments, to General Aniline & Film Corporation, New York, N. Y., a corporation of Delaware No Drawing. Application August 9, 1939, Serial No. 289,172. In Germany August 15, 1938

7 Claims. (Cl. 260—513)

Hydrazinoalkyl carboxylic acids are made by causing the corresponding halogenalkyl carboxylic acids to react with hydrazine hydrate. In contrast with the smooth course of this reaction hydrazinoalkyl sulphonic acids cannot in general be obtained by this method or can be obtained only in poor yield.

It is an object of the present invention to provide a process of producing hydrazinoalkyl sulphonic acids in good yield.

Further objects will become apparent from the following detailed description.

This invention relates to a process of making hydrazinoalkyl sulphonic acids in which hydrazine hydrate is added to an alkylene sulphonic acid or to a product of the action of alkali on a halogenalkyl sulphonic acid.

Thus when hydrazine hydrate is added to ethene sulphonic acid, hydrazinoethane sulphonic acid is obtained. The hydrazinoalkyl sulphonic acids may be conveniently isolated with the aid of benzaldehyde in the form of their benzal compounds.

The hydrazinoalkyl sulphonic acids are valuable parent materials for making substituted pyrazolones, the hydrazinoalkyl sulphonic acid being caused to react with a β-keto-carboxylic acid ester. The substituted pyrazolones are in their turn valuable intermediate products for making, among others, dyestuffs of the kind which are important in the production of color pictures by color forming development, the dyestuff component being added either to the photographic layer or to the developer.

The following examples illustrate the invention:

Example 1

130 grams of sodium vinyl sulphonate (1 mol) of the formula CH$_2$=CH—SO$_3$Na are dissolved in 600 cc. of water, the solution is mixed with 100 cc. of hydrazine hydrate of the formula

.H$_2$N—NH$_2$.H$_2$O and the mixture heated for 6 hours on the steam bath. In order to remove the excess of hydrazine 1 mol of benzaldehyde is added and the benzalazine of the formula C$_6$H$_5$CH=N—NH$_2$ thus formed is filtered. To filtrate another mol of benzaldehyde is added and the benzaldehyde compound of the hydrazinoethane sulphonic acid of the formula

C$_6$H$_5$CH=N—NH CH$_2$ CH$_2$ SO$_3$ H is precipitated, by acidifying with concentrated hydrochloric acid, in the form of crystals of melting point 200° C. The yield is nearly quantitative. For obtaining the free hydrazinoethane sulphonic acid of the formula

H$_2$N—NH CH$_2$ CH$_2$ SO$_3$ H 1 mol of the benzal compound of the hydrazinoethane sulphonic acid is mixed with 100 cc. of concentrated hydrochloric acid and the mixture is steam distilled. For further use the aqueous hydrochloric acid solution of the sulphonic acid may be applied.

The course of the reaction in the above example may be illustrated by the following equations CH$_2$:CH.SO$_3$Na+H$_2$O.H$_2$N.NH$_2$→
    H$_2$N.NH.CH$_2$.CH$_2$.SO$_3$Na+H$_2$O and C$_6$H$_5$.CHO+H$_2$N.NH.CH$_2$.CH$_2$.SO$_3$Na→
    C$_6$H$_5$CH:N.NH.CH$_2$.CH$_2$.SO$_3$Na+H$_2$O

Example 2

166 grams of sodium chlorethane sulphonate of the formula Cl CH$_2$CH$_2$ SO$_3$Na are dissolved in 300 cc. of water. The solution is mixed with 40 grams of caustic soda dissolved in 300 cc. of water and the whole is allowed to stand at ordinary temperature until the alkaline reaction has disappeared (about 24 hours). The solution thus obtained is then treated as described in Example 1 with 100 cc. of hydrazine hydrate and further worked up as described in that example.

Example 3

500 grams of sodium 1-chloro-2-hydroxypropane-3-sulphonate of the formula

Cl CH$_2$ CH OH CH$_2$ SO$_3$Na (about 2 mols of a product of 75 per cent strength) are stirred together with a solution of 80 grams of caustic soda in 600 cc. of water at the ordinary temperature until the alkaline reaction disappears (12 hours). 150 cc. of hydrazine hydrate are now added and the mixture is heated for 6 hours on the steam bath. By a fractional precipitation with benzaldehyde as described above the benzal compound of 1-hydrazine-2-hydroxypropane-3-sulphonic acid is isolated of the formula

C$_6$H$_5$.CH:N.NH.CH$_2$.CH.OH.CH$_2$.SO$_3$H

We claim:

1. In a process for producing a hydrazinoalkylsulphonic acid, the step which comprises heating hydrazine hydrate with a salt of an alkylenesulphonic acid.

2. In a process for producing a hydrazinoalkylsulphonic acid, the step which comprises heating hydrazine hydrate with the reaction product obtained by treating a halogenoalkyl sulphonic acid with alkali.

3. In a process for producing hydrazinoethanesulphonic acid, the step which comprises heating hydrazine hydrate with the sodium salt of vinylsulphonic acid.

4. In a process for producing 1-hydrazino-2-hydroxypropane-3-sulphonic acid, the step which comprises heating hydrazine hydrate with the sodium salt of 2-hydroxypropene(1,2)-3-sulphonic acid.

5. In a process for producing a hydrazinoalkylsulphonic acid, the step which comprises heating hydrazine hydrate with an alkali metal salt of an alkylenesulphonic acid and in solution crystallizing the reaction product from the solution by the addition of benzaldehyde and acidification of the reaction mixture.

6. A process as defined in claim 5 wherein the benzaldehyde is added in an amount sufficient to combine with the reaction product and to fix any excess of hydrazine.

7. A process as defined in claim 1 wherein the reaction is effected by heating the reactants in aqueous solution on a steam bath.

HANS ZISCHLER.
GUSTAV WILMANNS.